(12) United States Patent
Roux et al.

(10) Patent No.: US 12,346,108 B2
(45) Date of Patent: Jul. 1, 2025

(54) METHOD FOR REMOTE ASSISTANCE AND DEVICE

(71) Applicant: Siemens Aktiengesellschaft, Munich (DE)

(72) Inventors: Armin Roux, Erlangen (DE); Bin Zhang, Beijing (CN); Zhong Yang Sun, Beijing (CN); Shun Jie Fan, Beijing (CN); Ming Jie, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 170 days.

(21) Appl. No.: 18/041,597

(22) PCT Filed: Aug. 14, 2020

(86) PCT No.: PCT/CN2020/109374
§ 371 (c)(1),
(2) Date: Feb. 14, 2023

(87) PCT Pub. No.: WO2022/032688
PCT Pub. Date: Feb. 17, 2022

(65) Prior Publication Data
US 2023/0297109 A1    Sep. 21, 2023

(51) Int. Cl.
*G05D 1/00* (2024.01)
*G06F 3/01* (2006.01)
*G09B 19/24* (2006.01)

(52) U.S. Cl.
CPC ......... *G05D 1/0044* (2013.01); *G05D 1/0038* (2013.01); *G06F 3/011* (2013.01); *G06F 3/017* (2013.01)

(58) Field of Classification Search
CPC .... G05D 1/0044; G05D 1/0038; G06F 3/011; G06F 3/017; G06F 3/014; G09B 19/24; G09B 23/28; G09B 23/285
(Continued)

(56) References Cited

U.S. PATENT DOCUMENTS 9,665,985 B2    5/2017   Mullins et al.
2018/0293802 A1  10/2018  Hendricks et al.
(Continued)

FOREIGN PATENT DOCUMENTS

CN    110 753 218       2/2020    .......... H04N 13/122
CN    110751734 A       2/2020
(Continued)

OTHER PUBLICATIONS

Search Report for International Application No. PCT/CN2020/109374, 11 pages, May 12, 2021.
(Continued)

*Primary Examiner* — Tyler D Paige
(74) *Attorney, Agent, or Firm* — Slayden Grubert Beard PLLC

(57) ABSTRACT

The present disclosure provides a method for remote assistance and device. 1. A method for remote assistance, the method comprising:
   determining a state of a machine deployed at a working site;
   adjusting a digital twin of the machine to be in the same state as the machine deployed at the working site;
   rendering the digital twin at a remote site using a remote rendering device to enable a remote person at the remote site to perform an operation on the digital twin; and
   (Continued)

mapping an effect of the operation rendered as visual assistance information onto the machine at the working site using a local rendering device deployed at the working site.

15 Claims, 9 Drawing Sheets

(58) Field of Classification Search
USPC .................................................. 701/2
See application file for complete search history.

(56) References Cited

U.S. PATENT DOCUMENTS

| 2018/0324229 | A1  | 11/2018 | Ross et al. |
| 2019/0087544 | A1  | 3/2019  | Peterson ............... G06F 19/00 |
| 2019/0138667 | A1* | 5/2019  | Benesh ................ G06Q 50/08 |
| 2020/0160607 | A1  | 5/2020  | Kjallstrom et al. |
| 2020/0412813 | A1* | 12/2020 | Mong .................... B61L 27/04 |
| 2021/0157312 | A1* | 5/2021  | Cella ................... G01M 13/045 |
| 2021/0287459 | A1* | 9/2021  | Cella ................... G07C 5/0808 |

FOREIGN PATENT DOCUMENTS

| CN | 110 866 313    | 3/2020  | ............ G06F 30/17 |
| CN | 111 208 759    | 5/2020  | .......... G05B 19/042 |
| CN | 111 381 515    | 7/2020  | ............ G05B 17/02 |
| KR | 20190056935 A  | 5/2019  | ............ G06N 99/00 |
| KR | 20190095849 A  | 8/2019  | ............ G06Q 50/10 |
| WO | 2019/211713 A1 | 11/2019 | ............ G06Q 10/06 |

OTHER PUBLICATIONS

Shahriar, Md Rakib et al., "MTComm Based Virtualization and Integration of Physical Machine Operations with Digital-Twins in Cyber-Physical Manufacturing Cloud," 5th IEEE International Conference on Cyber Security and Cloud Computing (CSCloud)/4th IEEE International Conference on Edge Computing and Scalable Cloud (EdgeCom), pp. 46-51, Jun. 22, 2018.

Extended European Search Report, Application No. 20949186.9, 6 pages, Feb. 14, 2024.

Korean Office Action, Application No. 2023-7008674, 9 pages, Apr. 24, 2023.

Chinese Office Action, Application No. 202080103933.7, 8 pages, Jan. 17, 2025.

* cited by examiner

METHOD FOR REMOTE ASSISTANCE AND DEVICE

CROSS-REFERENCE TO RELATED APPLICATIONS

This application is a U.S. National Stage Application of International Application No. PCT/CN2020/109374 filed Aug. 14, 2020, which designates the United States of America, the contents of which are hereby incorporated by reference in their entirety.

TECHNICAL FIELD

The present disclosure relates to machine operations and/or repairs. Various embodiments of the teachings herein include methods and/or systems for remote assistance.

BACKGROUND

Machines are widely used in various fields of life and production. With the development in technologies, machines are having more and more capabilities and thus becoming more and more complex. A person may face various kinds of problems when operating or repairing a machine. At present, an expert is required to be at a working site to provide assistance to a person with insufficient experiences in operating or repairing a machine.

Alternatively, a person facing a problem may reach out to a remote expert through an audio or video communication session, describe his problems verbally, and receive verbal instructions from the remote expert. There has been some work done to address the problem. Some techniques use a remote virtual reality (VR) assistant system to enable a remote expert to communicate with a worker via a virtual assistant in a virtual reality space. Those techniques focus on promoting inter-person communication and understanding by providing alternative ways to better convey what the remote expert wants to say to the worker, e.g., through movements in the virtual reality space, gestures, facial expressions, conversations, message windows, etc. Sometimes, however, even if the remote experts have clearly expressed themselves, the workers may still unable to carry out an operation properly.

SUMMARY

In order to address at least some of disadvantages of current methods which emphasize inter-person communications, the present disclosure provides a remote assistance method and device to help improve hands-on skills of workers through remote assistance focusing on human-machine interactions. For example, some embodiments may include a method for remote assistance, comprising: adjusting a digital twin of a machine to be in the same state with the machine which is deployed at a working site; making the digital twin rendered at a remote site using a remote rendering device deployed at the remote site to enable a remote person at the remote site to perform an operation on the digital twin; and making an effect of the operation rendered as visual assistance information mapped onto the machine at the working site using a local rendering device deployed at the working site.

In some embodiments, making an effect of the operation rendered as visual assistance information mapped onto the machine at the working site comprises: identifying a component of the machine corresponding to a component of the digital twin being operated on by the remote person; generating visual content of the operation according to the effect caused by the operation on the digital twin; and making the local rendering device render the visual content at a position of the component of the machine.

In some embodiments, making the local rendering device render the visual content at a position of the component of the machine comprises: obtaining a working site image which depicts the working site and includes the machine; generating an overlay image which includes the visual content at a position corresponding to the component in the working site image; and making the local rendering device to render the overlay image superimposed onto the working site image.

In some embodiments, making the local rendering device render the visual content at a position of the component of the machine comprises: obtaining a position and a size of the component of the machine; generating a projection image which includes the visual content with a position and a size corresponding to the position and the size of the component; and making the local rendering device to project the projection image onto the machine.

In some embodiments, the method further comprises making visual content of an effect of a second operation rendered at the remote site using the remote rendering device, the second operation is performed on the machine by a local person at the working site.

In some embodiments, the visual content comprises at least one of: a digital mark made on a component of the machine; moving pictures presenting a hand performing an operation; or visual content presenting a component in a different state after an operation.

In some embodiments, the method further comprises: translating the operation into a control command; and causing the machine to perform an action specified by the control command.

In some embodiments, the method further comprises: making information of a workpiece produced by the machine presented by the remote rendering device for the remote person to provide feedback; and making feedback information made on the workpiece by the remote person presented by the local rendering device.

In some embodiments, adjusting the digital twin to be in the state of the machine comprises: obtaining the information about the state of the machine from a device at the working site; and adjusting the digital twin using the information.

In some embodiments, obtaining the information about the state of the machine comprises at least one of: receiving parameters of the machine from a control apparatus of the machine as the information; and receiving sensor data from at least one sensor coupled to the machine as the information.

In some embodiments, adjusting the digital twin using the information comprises modifying parameters of the digital twin until a simulated state of the digital twin is identical to the state specified by the information.

In some embodiments, making the digital twin rendered at the remote site comprises: providing an image of the digital twin to the remote rendering device; identifying in the digital twin a component being operated on by the remote person using a remote device which captures a gesture of the remote person; and changing a visual effect of the component in the image rendered by the remote rendering device.

In some embodiments, the method further comprises: storing an assistance information entry into a database, the assistance information entry comprises at least one of: the operation performed by the remote person, data of the adjusted digital twin, the information about the state of the machine, information about a task of the machine obtained via a human-machine interface; information about a workpiece produced by the machine; and in response to a request for assistance, making the visual assistance information specified in the assistance information entry mapped onto a second machine using a second local rendering device deployed at a second working site of the second machine in response to a determination that the assistance information entry stored in the database matches with information in the request.

As another example, some embodiments include a computing device, comprising at least one processor and memory storing computer-readable instructions executable by the at least one processor to implement one or more of the methods described herein.

As another example, some embodiments include a computer readable storage medium, storing computer-readable instructions executable by a processor to implement one or more of the methods described herein.

LIST OF REFERENCE NUMBERS

Figure 1:
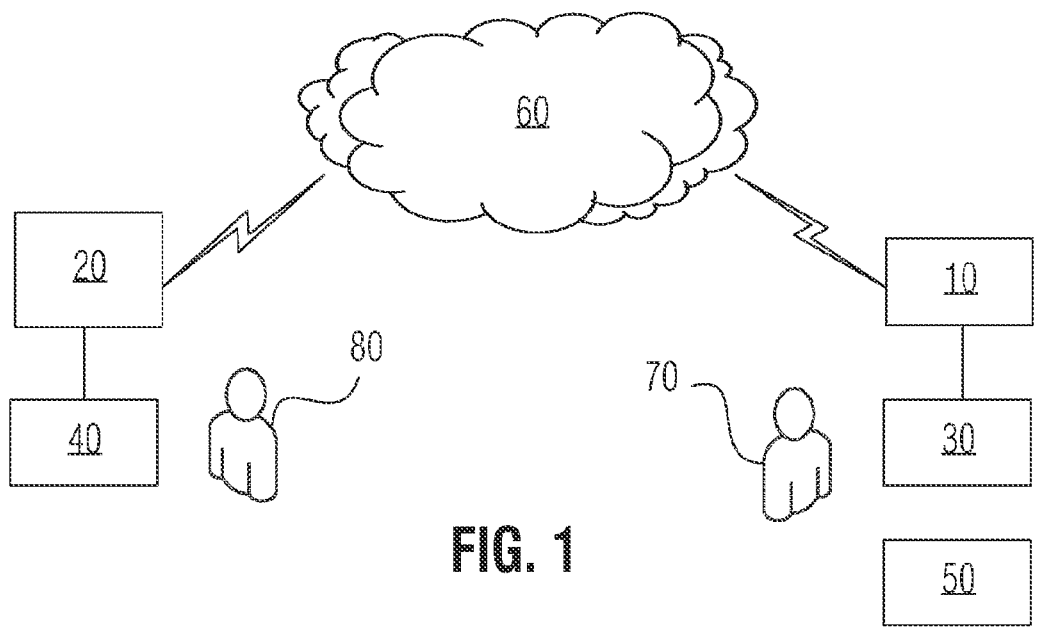
FIG. 1 is a schematic diagram illustrating an exemplary system incorporating teachings of the present disclosure.

| Reference numbers | Meanings |
|---|---|
| 10 | local computing device |
| 20 | remote computing device |
| 30 | local rendering device |
| 40 | remote rendering device |
| 50 | machine |
| 60 | network |
| 70 | local person |
| 80 | remote person |
| 90 | server |
| 21 | processor(s) |

-continued

| Reference numbers | Meanings |
|---|---|
| 22 | memory |
| 23 | I/O interface |
| 24 | network communications interface |
| 25 | operating system |
| 26 | I/O module |
| 27 | communication module |
| 28 | remote assistance module |
| 281 | data collection module |
| 282 | simulation module |
| 283 | visualization module |
| 29 | coupling mechanism |
| S11~S13, S21~S26, S31~S39, S41~S49 | method procedures |
| 31 | control panel |
| 32 | mark |
| 33 | knob |
| 34 | hand |
| 35 | crank |
| 36 | AR devices |
| 55 | virtual machine |
| 77 | virtual person |
| 56 | workpiece |
| 57 | virtual workpiece |

DETAILED DESCRIPTION

Various embodiments of the teachings herein include methods and/or systems for remote assistance. For example, some methods incorporating teachings of the present disclosure may include: adjusting a digital twin of a machine to be in the same state with the machine which is deployed at a working site; making the digital twin rendered at a remote site using a remote rendering device deployed at the remote site to enable a remote person at the remote site to perform an operation on the digital twin; and making an effect of the operation rendered as visual assistance information mapped onto the machine at the working site using a local rendering device deployed at the working site. By presenting visual effect of an operation performed by the remote person on the digital twin mapped onto the machine at the working site, the method can provide straightforward assistance to improve the hands-on skills of a worker at the working site, thus makes remote assistance more intuitive and highly efficient, shorten interruptions to the operation of a machine caused by a worker failing to fulfill a task or repair the machine.

In some embodiments, the procedure of adjusting the digital twin to be in the state of the machine may include: obtaining the information about the state of the machine from a device at the working site; and adjusting the digital twin using the information. As such, adjusting the digital twin using information of the machine collected from the working site can make simulation of the machine more accurate.

In some embodiments, the procedure of obtaining the information about the state of the machine may include at least one of: receiving parameters of the machine from a control apparatus of the machine as the information; or receiving sensor data from at least one sensor coupled to the machine as the information. When the machine is controlled by a control apparatus, some information can be directly collected from the control apparatus; sensors may also be used for collecting state information of the machine, especially when a control apparatus is not available.

In some embodiments, the procedure of adjusting the digital twin using the information may include modifying parameters of the digital twin until a simulated state of the digital twin is identical to the state specified by the information. Using the information to check whether the simulated digital twin is in the same state with the machine can ensure the simulated digital twin can precisely present the state of the machine, thus facilitate the remote person to understand the accurate state of the machine from the remote site and provide proper assistance to the person at the working site.

In some embodiments, the procedure of making the digital twin rendered at a remote site comprises: providing an image of the digital twin to the remote rendering device; identifying in the digital twin a component being operated on by the remote person using a remote device which captures a gesture of the remote person; and changing a visual effect of the component in the image rendered by the remote rendering device. As such, by providing real-time feedback on the operation to the remote person can enable the remote person to adjust their movements to attain a desired effect.

In some embodiments, the procedure of making the effect of the operation rendered as visual assistance information mapped onto the machine at the working site may include: identifying a component of the machine corresponding to a component of the digital twin being operated on by the remote person; generating visual content of the operation according to an effect caused by the operation on the digital twin; and making the local rendering device render the visual content at a position of the component of the machine. As such, rendering the visual content at the position of the component which is the object of the remote operation can help the person quickly locate the physical module which is operated at the remote site, thus the visual assistance information is more straightforward and readily understood by those assisted.

In some embodiments, the procedure of making the local rendering device render the visual content at a position of the component of the machine may include: obtaining a working site image which depicts the working site and includes the machine; generating an overlay image which includes the visual content at a position corresponding to the component in the working site image; and making the local rendering device to render the overlay image superimposed onto the working site image. By superimposing an image of the visual content onto the image of the machine, the method can generate augmented reality effects, thus make the remote assistance more efficient.

In some embodiments, the procedure of making the local rendering device render the visual content at a position of the component of the machine may include: obtaining a position and a size of the component of the machine; generating a projection image which includes the visual content with a position and a size corresponding to the position and the size of the component; and making the local rendering device to project the projection image onto the machine. By projecting the visual content directly onto the machine, the method can make the remote assistance more efficient.

In some embodiments, the method may also include making visual content of an effect of a second operation rendered at the remote site using the remote rendering device, the second operation is performed on the machine by a local person at the working site. By making an operation performed by a local person visible to the remote person, the method can provide a chance for the remote person to spot a flaw in the operation of the local person and provide accurate assistance and guidance to the local person.

In some embodiments, the visual content may include at least one of: a digital mark made on a component of the machine; moving pictures presenting a hand performing an operation; or visual content presenting a component in a different state after an operation. The above listed visual contents are effective in conveying communicated information between the party seeking assistance and the party providing assistance.

In some embodiments, the method may also include: translating the operation into a control command; and causing the machine to perform an action specified by the control command. By translating the remote operation into a control command for the machine, the method enables a remote person to control the machine remotely, thus the desired control operation can be better conveyed to the person seeking assistance through an example made at the working site.

In some embodiments, the method may also include: making information of a workpiece processed by the machine presented by the remote rendering device for the remote person to provide feedback; and making feedback information made on the workpiece by the remote person presented by the local rendering device. As such, by presenting information of a workpiece visible to the remote person, the remote person can check whether the workpiece satisfies requirements, thus the method can enable remote quality check and guarantee the local person master the skill through the assistance.

In some embodiments, the method may also include: storing an assistance information entry into a database, the assistance information entry comprises at least one of: the operation performed by the remote person, data of the adjusted digital twin, the information about the state of the machine, information about a task of the machine obtained via a human-machine interface; information about a workpiece processed by the machine; and in response to a request for assistance, making the visual assistance information specified in the assistance information entry mapped onto a second machine using a second local rendering device deployed at a second working site of the second machine in response to a determination that the assistance information entry stored in the database matches with information in the request. It can be seen that, by storing information about the visual assistance information into a database and rendering the visual assistance information specified by the stored information at a working site of a second machine, the method can reuse the visual assistance information provided by a remote person, and making the assistance information available whenever and wherever needed.

Some embodiments include computing devices and/or computer readable storage media for implementing one or more of the methods described herein.

The teachings of the present disclosure are described in further detail hereinafter with reference to accompanying drawings and examples. In the following description, numerous specific details are set forth in order to provide a thorough understanding of the present disclosure. It will be readily apparent however, that the present disclosure may be practiced without limitation to these specific details. In other instances, some functions, methods and structures have not been described in detail so as not to unnecessarily obscure the present disclosure. As used herein, the term "includes" means includes but not limited to, the term "including" means including but not limited to. The term "based on"

means based at least in part on. In addition, the terms "a" and "an" are intended to denote at least one of a particular element.

When a person has problems in operating or repairing a machine and there is no expert at the working site and no solution for the problems can be found in a manual, embodiments of the present disclosure can enable a remote expert to provide targeted assistance information visible to the person at the working site to help the working person to quickly improve hands-on skills. Various embodiments may be implemented in different system settings, and two exemplary system settings are illustrated in FIG. 1 and FIG. 2.

FIG. 1 is a schematic diagram illustrating an exemplary system incorporating teachings of the present disclosure. As shown in FIG. 1, the system may include a machine 50 at a working site, and a person (referred to as local person 70 hereinafter) attempting to operate or repair the machine 50. The "local" herein refers to being in proximity to the working site.

When the local person 70 has problem with the machine 50, e.g., in operating or repairing the machine 50, the local person 70 is capable of using a local computing device 10 to communicate with a remote computing device 20 of a remote person 80 at a remote site through a network 60. The "remote" herein refers to being away from the working site. The local computing device 10 may provide information about the real-time state of the machine 50 to enable the remote computing device 20 to present an image of a digital twin of the machine 50 using a remote rendering device 40 to the remote person 80. The remote computing device 20 may provide information about an operation performed by the remote person 80 on the digital twin to enable the local computing device to present an effect of the operation as visual assistance information using a local rendering device 30 to the local person.

Figure 2:
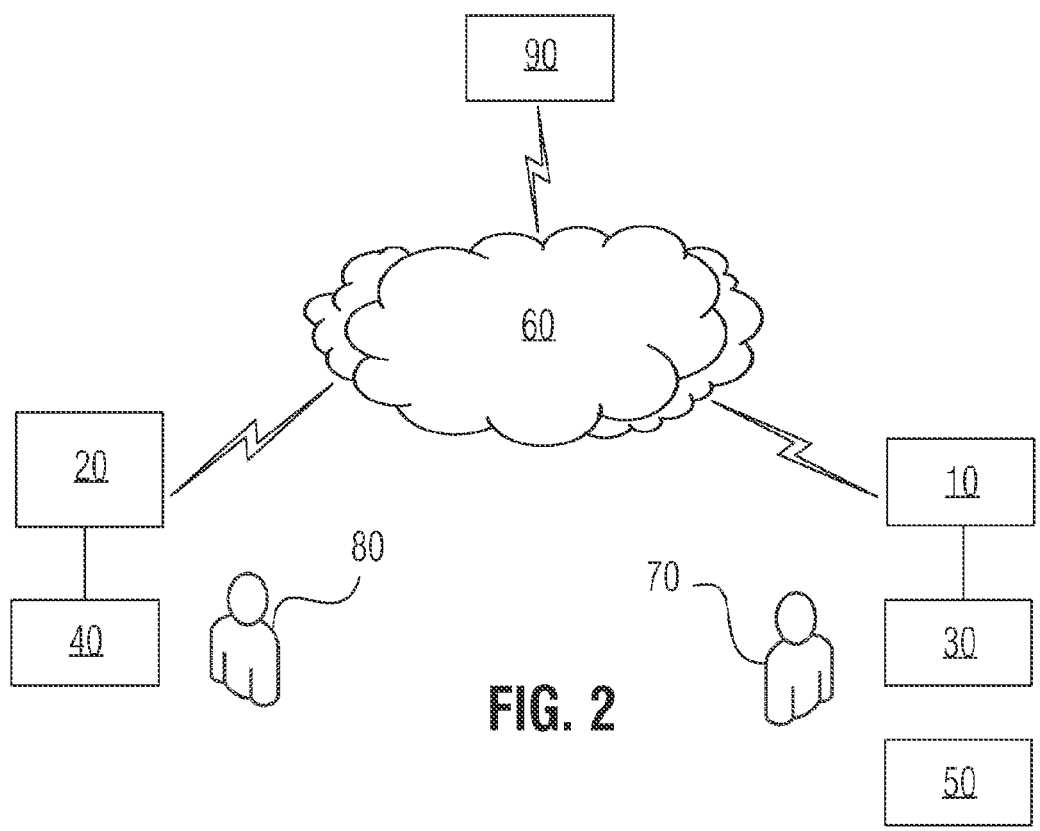
FIG. 2 is a schematic diagram illustrating another exemplary system incorporating teachings of the present disclosure.

FIG. 2 is a schematic diagram illustrating another exemplary system incorporating teachings of the present disclosure. The system of FIG. 2 is different from the system of FIG. 1 in that the system of FIG. 2 further includes a server 90. The local computing device 10 and the remote computing device 20 communicates with the server 90.

The server 90 may process real-time information about the machine 50. The information about the machine 50 may be provided by the local computing device 10, or by another local device (not shown) such as a data acquisition (DAQ) device, a host computer in an industrial Internet, or the like. The server 90 may provide a digital twin presenting the real-time state of the machine 50. For example, the server 90 may store in advance data of a digital twin of the machine 50, and be capable of adjusting parameters of the digital twin to simulate the real-time state of the machine 50.

In some embodiments, the server 90 may provide a (2D or 3D) image of the digital twin to the remote computing device 20, and providing an updated image of the digital twin after each adjustment to the digital twin in response to a change in the state of the machine 50, so as to achieve real-time synchronization of the digital twin with the machine 50. In some other examples, the server 90 may provide data of the digital twin to the remote computing device 20 and update parameters of the digital twin in the remote computing device 20 to achieve real-time synchronization of the digital twin with the machine 50.

The server 90 may also enable other communications between the local computing device 10 and remote computing device 20, such as those described in the following embodiments.

Figure 3:
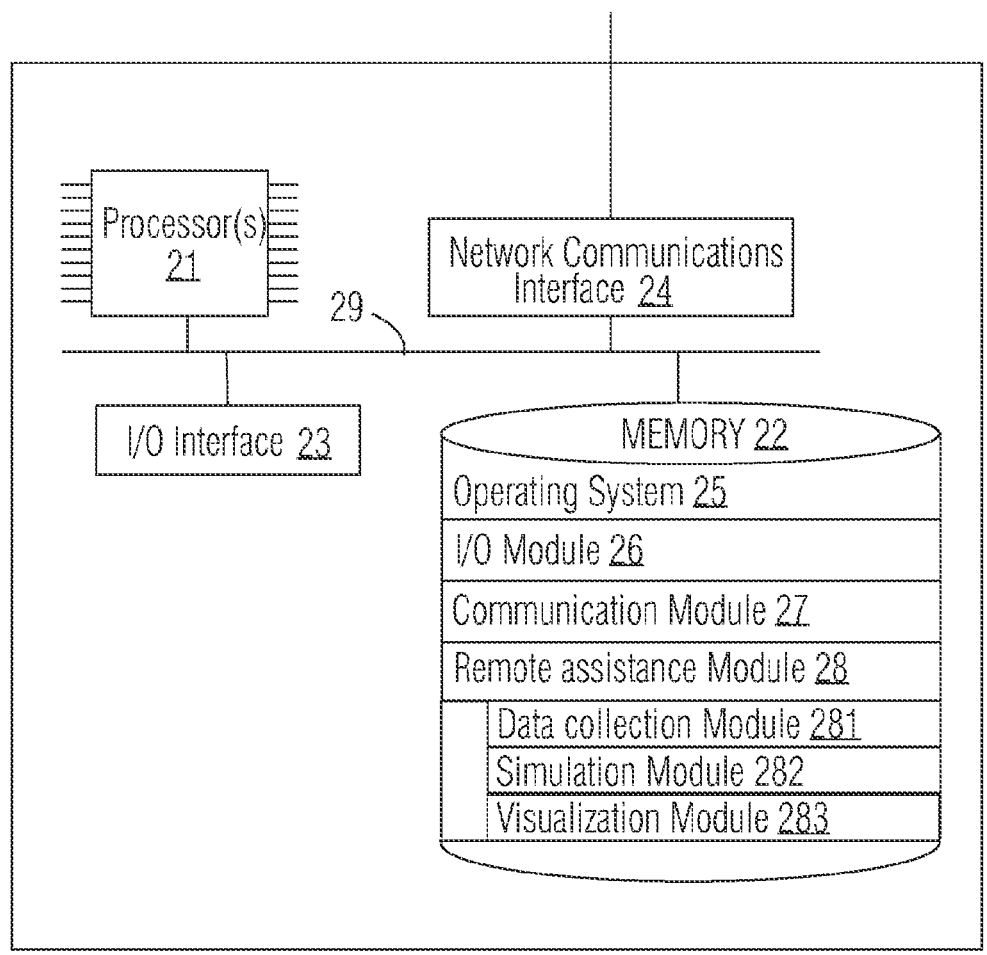
FIG. 3 is a schematic diagram illustrating a computing device incorporating teachings of the present disclosure.

The server 90, the local computing device 10 and the remote computing device 20 may have similar physical structures, such as the one as shown in FIG. 3. FIG. 3 is a schematic diagram illustrating a computing device incorporating teachings of the present disclosure. As shown in FIG. 3, the computing device may include processor(s) 21, memory 22, I/O interface 23, network communications interface 24, and a coupling mechanism 29 enabling communications between the components.

The I/O interface 23 may include human/machine interface(s), such as input interfaces, output interfaces. Input interfaces may be capable of interacting with one or more of: keyboard, mouse, trackpad, touch screen, data-glove, joystick, microphone, scanner, camera, etc. Output interfaces may be capable of interacting with tactile output devices (for example tactile feedback by the touch-screen, data-glove, or joystick, but there can also be tactile feedback devices that do not serve as input devices), audio output devices (such as speakers, headphones), visual output devices (such as screens to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays), and printers.

The network communications interface 24 may provide an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth.

Certain networks commonly require external network interface adapters that attached to certain general purpose data ports or peripheral buses; others are commonly integrated into the processor(s) 21 by attachment to the coupling mechanism 24 (for example Ethernet interface into a PC computer system or cellular network interface into a smartphone computer system). Using any of these networks, the computing device can communicate with other entities. Such communication can be uni-directional receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

The processor(s) 21 is capable of executing computer-readable instructions stored in the memory 22 to carry out various operations.

The memory 22 may include an operating system 25, an I/O module 26 for processing data interacted with the I/O interface 23, a communication module 27 for processing data interacted with the network communications interface 24, and a remote assistance module 28.

The remote assistance module 28 may be implemented in the form of computer-readable instructions executable by the processor(s) 21 to carry out the method of various embodiments. In other embodiments, the remote assistance module 28 may be implemented by hardware modules based on cost and efficiency considerations.

The remote assistance module 28 may include a data collection module 281, a simulation module 282 and a visualization module 283.

The data collection module 281 is capable of obtaining data from the working site and/or the remote site. Such data may include, for example, information about the real-time state of the machine 50, inputs of the local person 27 and/or the remote person 28, information about a workpiece processed by the machine 50, or the like.

The simulation module 282 is capable of adjusting a pre-defined digital twin to simulate the real-time state of the machine 50.

The visualization module 283 is capable of making the digital twin and/or inputs of the local person 27 and/or the remote person 28 visible to the local person 27 and/or the remote person 28.

Figure 4:
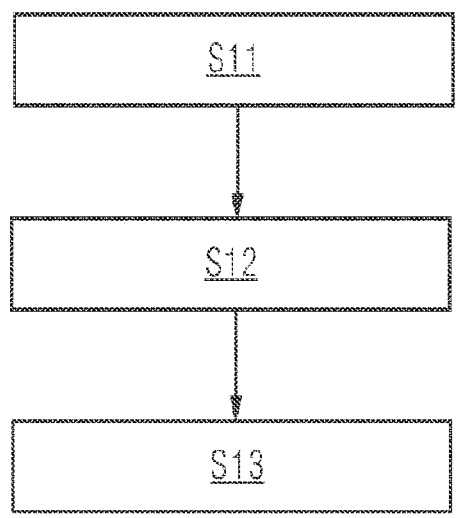
FIG. 4 is a flowchart illustrating a method for remote assistance incorporating teachings of the present disclosure.

Details about the process performed by the computing device are described hereinafter with reference to various embodiments. In some embodiments, the real-state of the machine 50 is made visible to the remote person 80 to enable the remote person 80 to quickly get a comprehensive understanding of the state of the machine 50 compared with relying only on verbal description of the state of the machine 50. FIG. 4 is a flowchart illustrating a method for remote assistance according to various embodiments of the present disclosure. The method may be performed by a computing device, such as the server 90, the local computing device 10, or the remote computing device 20. As shown in FIG. 4, the method may include the following procedures.

At block S11, the computing device may adjust a digital twin of a machine 50 to be in the same state with the machine 50 which is deployed at a working site. The machine 50 may be any mechanical or electrical apparatus for certain purposes, such as power generation, manufacture, measurement, testing, or the like. The working site refers to a place where the machine 50 is located.

The digital twin refers to a virtual representation of a physical product or process, used to understand and predict the physical counterpart's performance characteristics. The digital twin of the machine 50 has a virtual structure identical to the physical structure of the machine 50, exhibits virtual characteristics identical to the mechanical or electrical characteristics of the machine 50, and can simulate movements of components and/or internal procedures of the machine 50.

The state of the machine 50 may refer to physical and/or electrical conditions of the machine 50. The state may be embodied in one or multiple of the following information, such as, a voltage, a current, a rotation speed of a shaft, the speed of a moving component, the position of a component, measurement data output by the machine, an alert signal output by the machine, or the like. The information about the state of the machine 50 may be provided by a control unit embedded in the machine 50, or a standalone control device of the machine 50, or sensors coupled to the machine 50. The computing device may obtain the information from a direct communication connection with the devices that collected the information, or indirectly via another device or a network.

At block S12, the computing device may make the digital twin rendered at a remote site using a remote rendering device 40 deployed at the remote site to enable a remote person 80 at the remote site to perform an operation on the digital twin. The remote site refers to a place where the remote person 80 being consulted is located, and is away from the working site.

The remote rendering device may be a visual output device having a screen, or output device capable of providing stereographic output, such as virtual-reality glasses, holographic displays, or the like.

The computing device may enable the remote person 80 to perform operations on the rendered digital twin, e.g., via an input device. The input device may be selected from, for example, keyboard, mouse, trackpad, touch screen, data-glove, joystick, microphone, scanner, camera, etc. For example, the computing device may capture the motion of the remote person 80 through, e.g., a data-glove, and use the captured motion to cause movements of a cursor to determine an element in the rendered visual content that is operated on at the remote site. For another example, the computing device may capture the gestures of the remote person 80 through, e.g., one or multiple cameras, and use the captured gestures to cause movements of a simulated hand rendered on top of the image of the digital twin at the remote site. Other examples may use different or different combinations of input devices to capture the operation of the remote person 80 on the digital twin. The operation may be selected from, for example, highlighting a component of the digital twin, adding a mark at a specified position, changing the state (e.g., spatial position, angular position, on/off state, etc.) of a component of the digital twin, performing actions of manipulating a component of the digital twin, or the like.

At block S13, the computing device may make an effect of the operation rendered as visual assistance information mapped onto the machine 50 at the working site using a local rendering device deployed at the working site. The effect of the operation refers to changes made to the digital twin or to the image of the digital twin by the remote person 80 through the operation performed, e.g., a mark added at a position in the rendered image of the digital twin, a simulated hand manipulating a component of the digital twin, a change in the state of a component of the digital twin, or the like.

The computing device may map the effect of the operation onto the machine 50 and make the effect rendered as visual assistance information at the working site. In some examples, the local rendering device 30 may render the visual assistance information over an image of the machine 50. In some other examples, the local rendering device 30 may project the visual assistance information onto the machine 50.

As such, by presenting visual effect of an operation performed by the remote person on the digital twin mapped onto the machine at the working site, the method can provide straightforward assistance to improve the hands-on skills of a worker at the working site by a remote assisting person, thus makes remote assistance more intuitive and highly efficient, and shorten the interruptions to the operation of the machine caused by a worker failing to fulfill a task or repair the machine.

Real-Time Simulation of Machine Using Digital Twin

Building a digital twin involves techniques such as multi-physics simulation, data analytics, and machine learning capabilities. Conventionally, digital twins are used to demonstrate the impact of design changes, usage scenarios, environmental conditions, and other variables, thus can eliminate the need for building a physical prototype, reduce development time, and improve quality of the finalized product or process.

Various embodiments of this disclosure take advantage of the accurate modelling of machines of the digital twins, and uses a digital twin to present the real-time state or performance of a machine at a remote site to enable remote assistance in machine manipulation, machine failure diagnosis, or the like.

To accurately simulate the real-time performance of the machine 50, the computing device may obtain the information about the state of the machine 50 from a device at the working site, and adjust the digital twin using the information.

In some embodiments, the computing device may receive parameters of the machine 50 from a control apparatus of the machine 50 as the information. In some examples, the parameters may include operating parameters of the machine 50. Operating parameters refer to parameters related with operations of the machine 50, e.g., power supply parameters, motion parameters of a moving part of the machine 50, etc. In some examples, the parameters may include process parameters. Process parameters refer to the current measured value of a particular part of a process which is being monitored or controlled. In other examples, other parameters may be obtained as the information. As such, adjusting the digital twin using information of the machine collected from the working site can make simulation of the machine more accurate.

In some embodiments, the computing device may receive sensor data from at least one sensor coupled to the machine 50 as the information. Sensors are generally coupled to the machine 50 to determine real-time performance, operating conditions, and changes over time of the machine 50, for purposes such as abnormal detection, offset correction, etc. The computing device may use the sensor data as the information for adjusting the digital twin of the machine 50.

It can be seen that, when the machine is controlled by a control apparatus, some information can be directly collected from the control apparatus; sensors may also be used for collecting state information of the machine, especially when a control apparatus is not available. In other embodiments, the computing device may obtain other data about the machine 50 as the information.

The computing device can obtain the information from one or multiple devices at the working site. In an example, the device at the working site providing the information may include a control apparatus embedded in the machine 50, e.g., a microcontroller, a computerized control unit of a CNC machine, or the like, having a data transmission interface such as OPC (OLE for Process Control) UA (Unified Architecture). In another example, the device at the working site providing the information may also include a standalone control device of the machine 50, e.g., a drive, a work station, a host computer, or the like. In yet another example, the device at the working site providing the information may also include a Data Acquisition (DAQ) device, an edge device, or the like, which collects real-time data of the machine 50 from one or multiple data sources. The above are merely some examples, and the computing device may obtain the information from other devices in other examples.

The computing device may use the information to continuously update the digital twin to reflect any change to the machine 50 throughout the remote assistance process, to enable timely and accurate remote assistance. In some embodiments, the computing device may modify parameters of the digital twin until a simulated state of the digital twin is identical to the state specified by the information.

Using the information to check whether the simulated digital twin is in the same state with the machine can ensure the simulated digital twin can precisely present the state of the machine, thus facilitate the remote person to understand the accurate state of the machine from the remote site and provide proper assistance to the person at the working site.

In an example, the server 90 is a server device in a server cluster or in a cloud system. The server 90 may have access to a database storing digital twin models of machine tools. After receiving a remote assistance request from a local computing device 10, the server 90 may identify the digital twin model corresponding to a machine tool specified in the remote assistance request. The server 90 may obtain information about the current state of the machine tool from the database which records performance information of the machine tools continuously reported by a DAQ device from the working site of the machine tool. The server 90 may adjust the digital model to the state of the machine tool, and transmits the real-time synchronous digital twin model of the machine tool to the remote computing device 20. The remote person 80 may interact with the digital twin model through AR glasses and AR gloves. The remote computing device 20 may transmit interactions of the remote person 80 with the digital twin model to the server 90. The server 90 may simulate the operations of the remote person 80, and transmit effects of the operations to the local computing device 10. The local computing device 10 may render the effects as visual remote assistance information using an AR device, e.g., AR glasses worn by the local person 70.

Rendering at the Remote Site

In order to enable the remote person 80 to quickly get a comprehensive understanding of the state of the machine 50, an image, either 2D or 3D, of the digital twin may be rendered by a remote rendering device 40 at the remote site. In some embodiments, the computing device may provide an image of the digital twin to the remote rendering device 40, identify in the digital twin a component being operated on by the remote person 80 using a remote device which captures a gesture of the remote person, and change a visual effect of the component in the image rendered by the remote rendering device.

In some embodiments, the local computing device 10 may adjust the digital twin according to the state of the machine 50, and transmit an image of the digital twin to the remoting computing device 20 which renders the image via the remoting rendering device 40.

In some embodiments, the remote computing device 20 may obtain information about the machine 50 from the local computing device 10 or a DAQ device, adjust the digital twin accordingly, and render an image of the digital twin using the remote rendering device 40.

In some embodiments, the server 90 may obtain information about the machine 50 from the local computing device 10 or a DAQ device, adjust the digital twin accordingly, and transmit an image of the digital twin to the remote computing device 20 which renders the image using the remote rendering device 40.

The above are merely some examples, in other examples, the local computing device 10, the remote computing device 20 and the server 90 may inter-work in a different manner to make the digital twin of the machine 50 rendered at the remote rendering device 40.

As such, by providing real-time feedback on the operation to the remote person can enable the remote person to adjust their movements to attain a desired effect.

Rendering at the Working Site

After the remote person 80 inputs assistance information by performing an operation based on the rendered digital twin, the assistance information may be rendered at the working site in the form of visual content to make the local person 70 easily understand the assisted information. To achieve better effects of remote assistance, the visual assistance information can be mapped onto the machine 50 at the working site, so as to clearly identify a component or an operation concerned in the assistance information. In some embodiments, the computing device may identify a component of the machine 50 corresponding to a component of the digital twin being operated on by the remote person 80, generate visual content of the operation according to an effect caused by the operation on the digital twin, and make the local rendering device 30 render the visual content at a position of the component of the machine 50. As such, rendering the visual content at the position of the component which is the object of the remote operation can help a person quickly locate the physical module which is operated at the remote site, thus the visual assistance information is more straightforward and readily understood by those assisted.

Figure 5A:
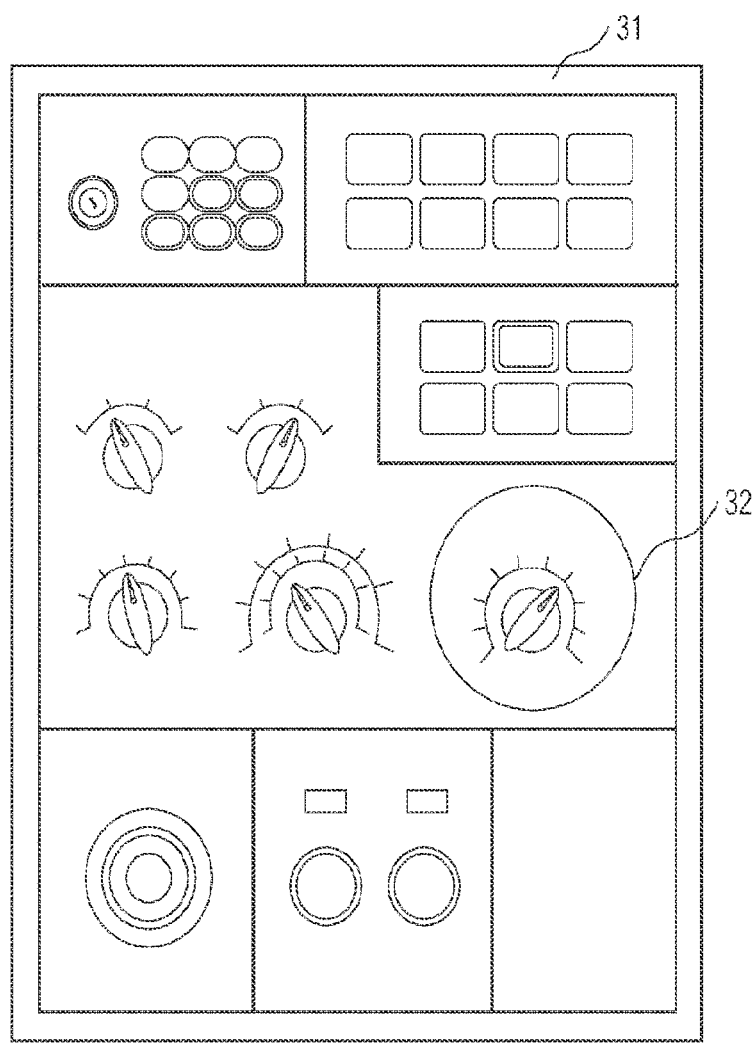
FIGS. 5A-5C are schematic diagrams illustrating examples of visual content rendered at the working rendering device incorporating teachings of the present disclosure.
Figure 5B:
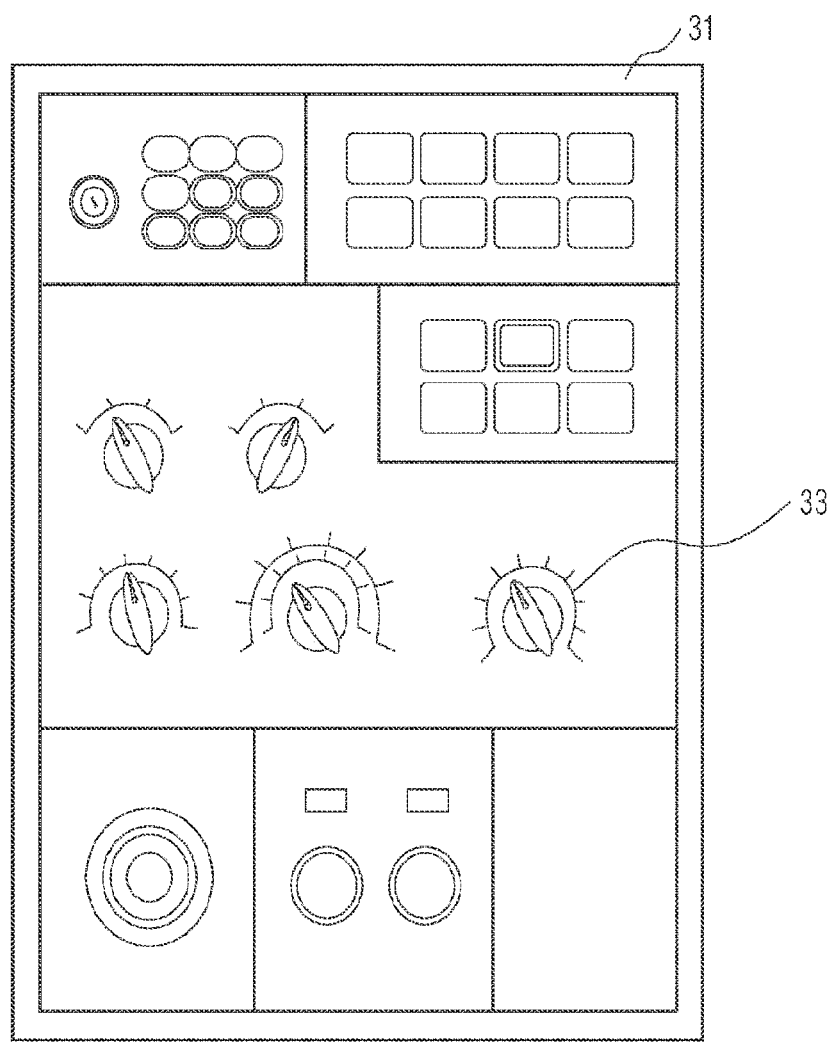
Figure 5C:
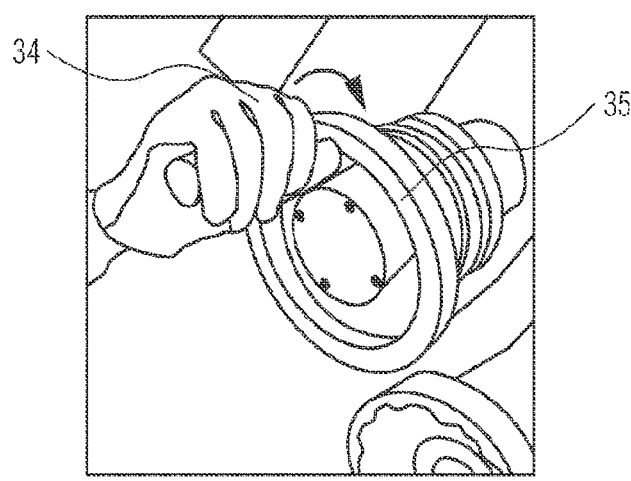

The visual content may be any effect intended by the remote person 80 to help the local person 70. FIGS. 5A-5C are schematic diagrams illustrating examples of visual content rendered at the local rendering device 30 according to various embodiments of the present disclosure.

For example, the visual content may be a digital mark made on a component of the machine 50. As shown in FIG. 5A, the remote person 80 may select via an option provided in a user interface by the remote computing device 20 to draw a mark 32 the image of the digital twin. The mark 32 may be made on a button of a control panel of the digital twin. The computing device may make the local rendering device 30 render the visual content of the mark 32 at the position of the corresponding button on the control panel 31 of the machine 50. The rendered visual effect at the working site and/or the remote site may be as shown in FIG. 5A.

In some embodiments, the visual content may be visual content presenting a component in a different state after an operation. As shown in FIG. 5B, the remote person 80 may select via an option provided in a user interface by the remote computing device 20 to manipulate a component of the digital twin. The computing device may make the local rendering device 30 render the visual content (e.g., the appearance) of the component after the operation of the remote person 80 at the position of the corresponding physical component of the machine 50. As shown in FIG. 5B, the remote person 80 may perform an operation to turn a knob 33 on a control panel of the digital twin to point to another value, the appearance of the knob 33 may be rendered to point to the another value over corresponding knob on the control panel 31 of the machine 50.

In some embodiments, the visual content may be moving pictures presenting a hand performing an operation. As shown in FIG. 5C, the remote person 80 may select via an option provided in a user interface by the remote computing device 20 to perform a demonstrative operation using the digital twin. The computing device may make the local rendering device 30 render the visual content of the demonstrative operation at the position of the physical component corresponding to the manipulated component of the digital twin. As shown in FIG. 5C, the remote person 80 may perform an operation to turn in a crank of the digital twin, and moving pictures of a hand 34 moving in the clockwise direction may be rendered over the crank 35 of the machine 50.

The above are merely some examples for illustrating the visual assistance information rendered at the working site. Other embodiments may render other types of visual assistance information according to the needs. Since visual contents are more efficient in conveying the intended operation than verbal descriptions, embodiments of the present disclosure can improve the remote assistance effects.

In some embodiments, the computing device may identify the position of the component where the visual assistance information is rendered over using various possible techniques. For example, the computing device may identify the position or the component in an image captured of the working site by using pattern recognition techniques or using a machine learning system for image processing, or the like. In an example, the computing device may first identify the position and posture of the machine 50 in a real-time image of the working site. Then, the computing device may check whether the component concerned is present in the image. In response to a determination that the component is not present in the image, the computing device may send out information prompting the local person to move to obtain another image of the working site which includes the component concerned. After identifying the position of the component in the image of the working site, the computing device may cause the visual assistance information rendered at the position of the component, so as to map the visual assistance information to a proper position to present an effect that the virtual operation is performed on the physical machine 50.

Various methods may be adopted to map the visual assistance information to the physical machine 50. The following are two examples for illustrative purposes only.

Example One: Image Superimposition

In some embodiments, the computing device may make the local rendering device 30 render the visual content at a position of the component of the machine 50 by superimposing an image including the visual content onto an image of the machine 50. As an example, the computing device may obtain a working site image which depicts the working site and includes the machine, generate an overlay image which includes the visual content at a position corresponding to the component in the working site image, and making the local rendering device 30 to render the overlay image superimposed onto the working site image.

In some embodiments, the local rendering device 30 may be AR glasses worn by the local person 70. In an example, the computing device may prompt the local person to move to a proper position to have the images of the control panel 31 or the crank 35 of the machine 50 captured by the AR glasses, and make the AR glasses to superimpose the visual content corresponding to the mark 32, or the appearance of the knob 33, or the moving pictures illustrating movements of the simulated hand 34 superimposed onto the area corresponding to the control panel 31 or the crank 35 in the image of the working site, to achieve the rendering effects as shown in FIGS. 5A-5C.

By superimposing an image of the visual content onto the image of the machine, the method can generate augmented reality effects, thus make the remote assistance more efficient.

Example Two: Image Projection

In some embodiments, the computing device may make the local rendering device 30 render the visual content at a position of the component of the machine 50 by projecting the visual content on to a proper position of the machine 50. As an example, the computing device may obtain a position and a size of the component of the machine 50, generate a projection image which includes the visual content with a position and a size corresponding to the position and the size of the component, and make the local rendering device 30 to project the projection image onto the machine 50.

In some embodiments, the local rendering device 30 may be one or multiple projectors deployed in proximity to the machine 50 or deployed in a wearable device worn by the local person 70. In an example, the computing device may prompt the local person to move to a proper position to capture an image including the control panel 31 or the crank 35 of the machine 50 using a camera in a wearable device worn by the local person 70, identified the position and the size of the control panel 31 or the crank 35 in the image, generate an image(s) including the mark 32, or the appearance of the knob 33, or the moving pictures illustrating movements of the simulated hand 34 with a corresponding position and a corresponding size, and make the projector to project the image(s) onto the machine 50, to achieve the rendering effects as shown in FIGS. 5A-5C.

By projecting the visual content directly onto the machine, the method can make the remote assistance more efficient.

Remote Control of the Machine 50 for Demonstration

In some embodiments, the remote person 80 may choose via an option in a UI to perform an operation on the machine 50 through remote control, for example, to show the local person how the machine 50 processes a workpiece properly. The computing device may translate the operation performed by the remote person 80 into a control command, and cause the machine 50 to perform an action specified by the control command.

Figure 6:
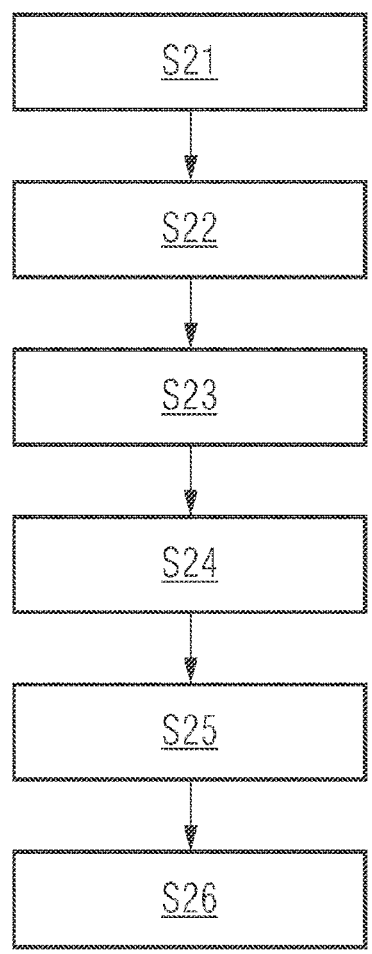
FIG. 6 is a schematic diagram illustrating a process of remote controlling a machine to perform a processing incorporating teachings of the present disclosure.

FIG. 6 is a schematic diagram illustrating a process of remote controlling a machine to perform a processing incorporating teachings of the present disclosure. As shown in FIG. 6, the process may include the following procedures.

At block S21, a computing device receives a request for calling an expert. When the computing device is the local computing device 10, the local computing device 10 may receive the request via a user interface. When the computing device is the remote computing device 20 or the server 90, the request may be received from the local computing device 10.

At block S22, the computing device receives information about the machine. The information is about the real-time state of the machine.

At block S23, the computing device make the virtual digital twin presented at the remote rendering device 40.

At block S24, the computing device receives an operation performed by the expert (i.e., the remote person 80). The remote person 80 may select whether to perform remote control or remote assistance using options provided in a user interface.

At block S25, the computing device generates a remote control command corresponding to the operation.

At block S26, the computing device sends the remote control command to a device at the working site to make the machine 50 perform an action. By translating the remote operation into a control command for the machine, the method enables a remote person to control the machine remotely, thus the desired control operation can be better conveyed to the person seeking assistance through an example made at the working site.

Inspection of Worker Operation

In some embodiments, operations of the local person 70 may be presented to the remote person 80 for inspection. In an embodiment, the computing device may make visual content of an effect of a second operation rendered at the remote site using the remote rendering device 40. The second operation is performed on the machine 50 by the local person 70 at the working site.

The effect of the second operation may be visual content presenting changes to the state of the machine, or may be moving pictures showing the operation performed by the local person 70. For example, the computing device may obtain video data captured by a camera showing the process of the local person 70 manipulating the machine 50, and make the video data rendered by the remote rendering device 40 as the visual content. For another example, the computing device may generate a virtual hand manipulating the digital twin to simulate the second operation of the local person 70, and make the remote rendering device 40 to render the virtual hand manipulating the digital twin and changes of the digital twin, e.g., the changes in the state of a component of the digital twin, caused by the second operation. In various embodiments, the rendering of the second operation on the machine at the remote site is similar to the rendering of the operation of the remote person on the digital twin at the local site as described above in connection with FIGS. 4 and 5A-5C.

Figure 7:
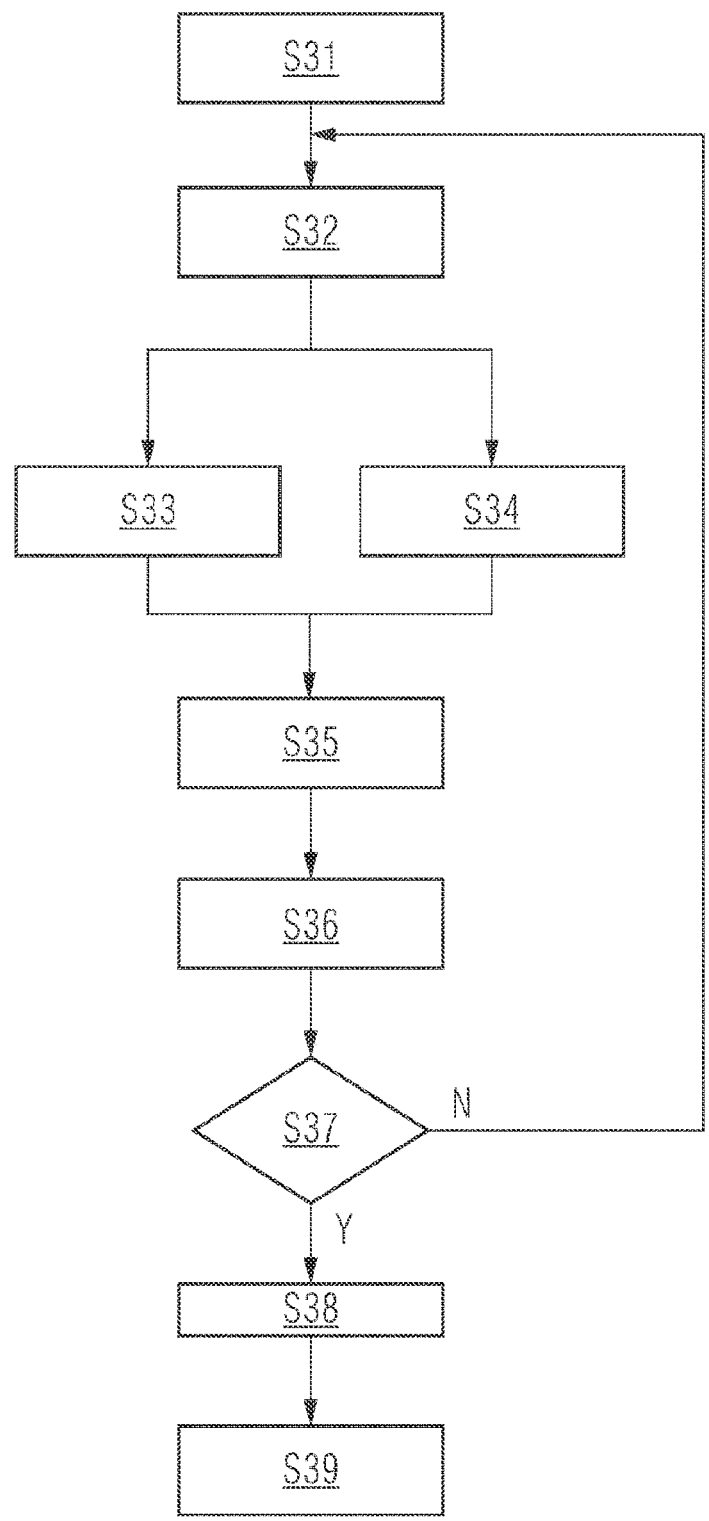
FIG. 7 is a flowchart illustrating a process of remote inspection of worker operation incorporating teachings of the present disclosure.

FIG. 7 is a flowchart illustrating a process of remote inspection of worker operation incorporating teachings of the present disclosure. As shown in FIG. 7, the process may include the following procedures.

At block S31, the computing device receives a request for remote inspection. The request may be initiated by the local person 70 or the remote person 80 at any stage of the remote assistance process.

Figure 8:
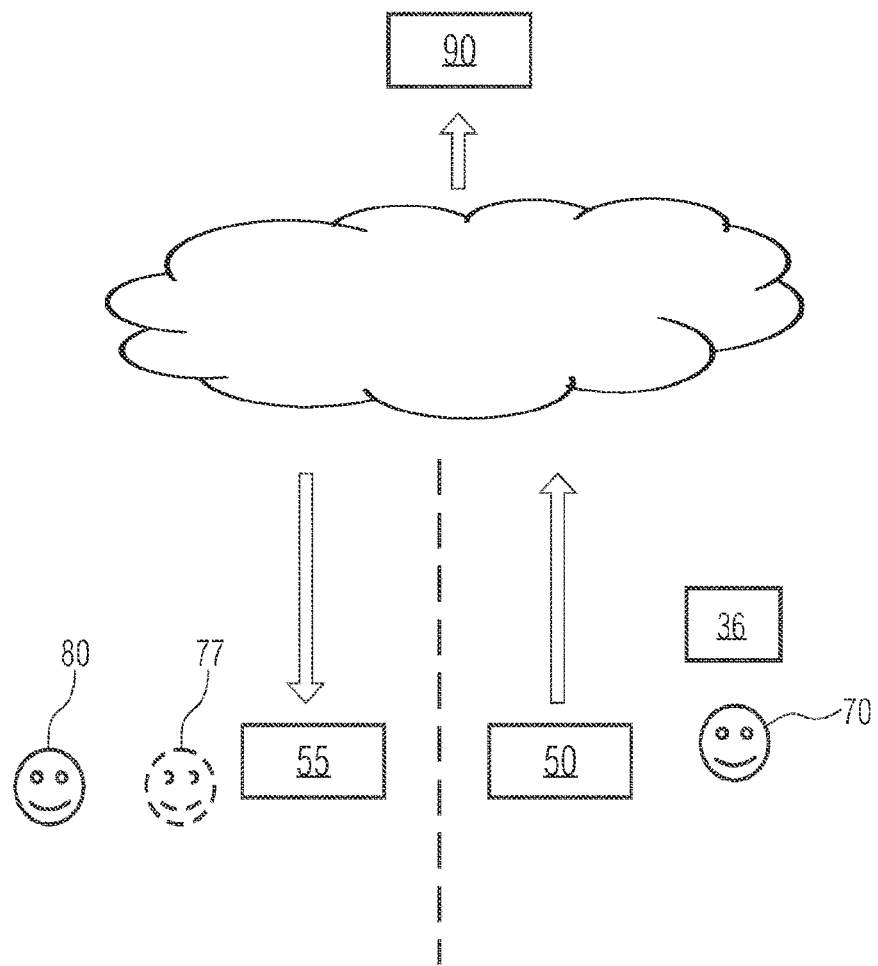
FIG. 8 is a schematic diagram illustrating a remote inspection of local operations incorporating teachings of the present disclosure.

FIG. 8 is a schematic diagram illustrating a remote inspection of local operations incorporating teachings of the present disclosure. As shown in FIG. 8, the local person 70 may initiate a request for remote inspection to the server 90 via the local computing device 10.

At block S32, the computing device makes a device at the working site collect information about the operations of the local person 70. In the example shown in FIG. 8, the server 90 may request an AR device 36 at the working site to collect information about operations performed by the local person 70 (referred to as local operations for short).

At block S33, the computing device adjusts the digital twin to simulate the real-time state of the machine 50 using the information about the machine 50.

At block S34, the computing device obtains visual content presenting the operations of the local person 70. The server 90 may generated simulated movements of the local person 70 using the information, or uses video data captured of the local person 70 as the visual content.

At block S35, the computing device makes the visual content presenting the operations and the digital twin rendered at the remote rendering device 40. In the example shown in FIG. 8, the visual content about the local operations and the real-time synchronized digital twin may be rendered at the remote site as a virtual person 77 and a virtual machine 55, to make it appears to the remote person 80 that the local person 70 and the machine 50 are at the remote site.

At block S36, the computing device receives an evaluation result provided by the remote person 80, and judges whether the evaluation result indicates the local operations are qualified. In response to a determination that the local operations are qualified, the procedure at block S37 may be performed. In response to a determination that the local operations are not qualified, process may go back to the procedure at block S32 to continue the remote inspection process.

At block S37, the computing device provides the evaluation result to the local person 70.

At block S38, the computing device may store the evaluation result and the information about the local operations into a database.

In some embodiments, the worker (i.e., local person 70) may wear AR devices 36 (e.g., AR glasses and digital gloves) to operate the machine tool. The computing device may use data collected by the AR devices and data of the digital twin to achieve real-time simulation of the worker's processing, e.g., may synthesize the simulated operations with the digital twin, and the synthesized data may be presented to the remote expert (i.e., the remote person 80).

The remote expert supervises the real-time simulation of the worker's processing through AR devices at the remote site, and may provide guidance. For example, the remote expert may perform an operation on the visual content of the real-time simulation data, e.g., making a gesture or adding a mark on the visual content. The computing device may transmit the operation of the remote expert to the worker's AR device to direct the worker to complete the task. The process is similar to the process as shown in FIG. 4, and the visual effects may be similar to those as shown in FIGS. 5A-5C.

By making an operation performed by a worker visible to the remote expert, the method can provide a chance for the remote person to spot a flaw in the operation of the worker and provide accurate assistance and guidance to the worker.

Workpiece Inspection

In some embodiments, information about a workpiece processed by the machine 50 may be presented to the remote person 80 for inspection. In an embodiment, the computing device may making information of a workpiece processed by the machine 50 presented by the remote rendering device 40 for the remote person 80 to provide feedback, and make feedback information made on the workpiece by the remote person 80 presented by the local rendering device 70.

Figure 9:
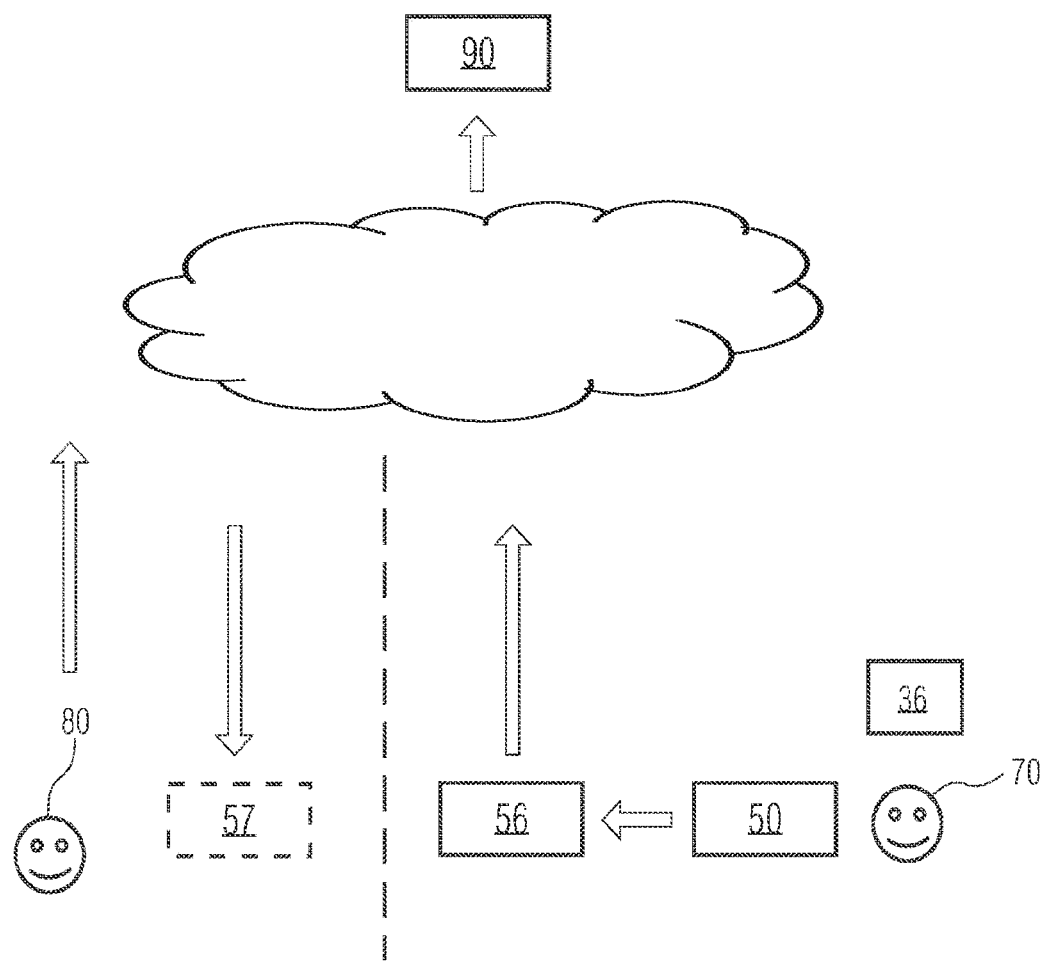
FIG. 9 is a schematic diagram illustrating the remote inspection of a workpiece incorporating teachings of the present disclosure.

FIG. 9 is a schematic diagram illustrating the remote inspection of a workpiece incorporating teachings of the present disclosure. The server 90 may receive a request for remote inspection of a workpiece initiated by the local person 70 or the remote person 80. The server 90 may receive information of a workpiece 56 processed by the machine 50, e.g., sensor data detected by at least one sensor, e.g., the size of the workpiece 56, the weight of the workpiece 56, the shape of the workpiece 56, or the like. The server 90 transmits data of a digital version of the workpiece 56, i.e., the virtual workpiece 57, to the remote computing device 20 which renders the virtual workpiece 57 using the remote rendering device 40. The server 90 may transmit feedback information, e.g., a mark made on the virtual workpiece 57 or an evaluation result, received from the remote computing device 20 to the local computing device 10. In some examples, the server 90 may store the feedback information and the data of the workpiece 56 into a database.

As such, by presenting information of a workpiece visible to the remote person, the remote person can check whether the workpiece satisfies requirements, thus the method can enable remote quality check and guarantee the local person master the skill through the assistance.

Reusing Visual Assistance Information

The assistance information provided by experts is valuable experiences. In various embodiments, the assistance information may be stored and reused subsequently. The computing device may store various assistance information, including operations performed on the digital twin or a workpiece, operations for remote controlling the machine 50, evaluation information about local operations or a workpiece, etc.

According to an example, after the process as shown in FIG. 4, the computing device may create and store an assistance information entry in a database. The assistance information entry may include at least one of: the operation performed by the remote person 80, data of the adjusted digital twin, the information about the state of the machine 50, information about a task of the machine 50 obtained via a human-machine interface, or the like.

In some embodiments, after a remote control of the machine 50, the computing device may create and store an assistance information entry in a database. The assistance information entry may include at least one of: the operation performed by the remote person 80, the control command, the information about the state of the machine 50 before and after the remote control, information about a task of the machine 50 obtained via a human-machine interface, or the like.

In some embodiments, after a remote inspection of local operations, the computing device may create and store an assistance information entry in a database. The assistance information entry may include at least one of: information of the local operations evaluated to be qualified by the remote person 80, feedback information provided by the remote person 80, the information about the state of the machine 50 before and after the local operations, information about a task of the machine 50 obtained via a human-machine interface, or the like.

In some embodiments, after a remote inspection of a workpiece, the computing device may create and store an assistance information entry in a database. The assistance information entry may include at least one of: information of the workpiece, feedback information provided by the remote person 80, the information about the state of the machine 50 when processing the workpiece, information about a task of the machine 50 obtained via a human-machine interface, or the like.

In response to a request for assistance from a second person, the computing device may make the visual assistance information specified in the assistance information entry mapped onto a second machine using a second local rendering device deployed at a second working site of the second machine in response to a determination that the assistance information entry stored in the database matches with information in the request.

Figure 10:
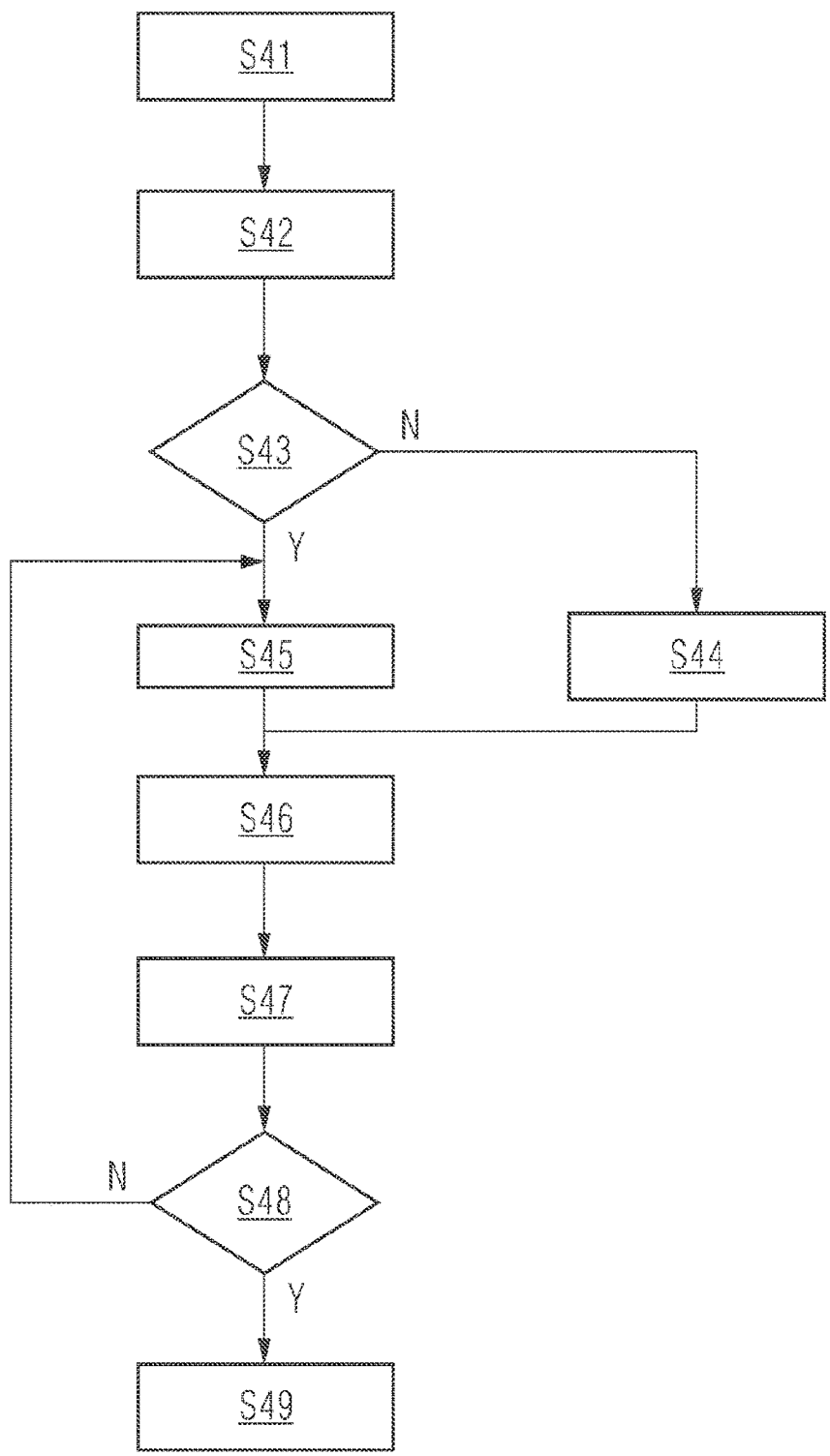
FIG. 10 is a schematic diagram illustrating a process of providing remote assistance incorporating teachings of the present disclosure.

FIG. 10 is a schematic diagram illustrating a process of providing remote assistance incorporating teachings of the present disclosure. As shown in FIG. 10, the process may include the following procedures.

At block S41, the computing device receives a request for remote assistance initiated by a worker.

At block S42, the computing device obtains machine data and task information. The machine data may include information identifying the type of the machine, e.g., the brand and model of the machine, an ID of the machine, or the like. The computing device may obtain details about the machine from a machine database using the machine ID. The machine data may be inputted through an input device at the working site, e.g., through manual input or selection, through a microphone receiving speech, through a scanner scanning a quick response code of the machine, etc. The task information refers to a task intended to be done. The task information may be inputted via an input device, e.g., through a keyboard, through a mouse key clicking on an option, through a microphone receiving speech, or the like.

At block S43, the computing device searches a database for an assistance information entry matching with the machine data and the task data.

At block S44, in response to a determination that an assistance information entry matching with the machine data and the task data is found, the computing device makes visual assistance information in the assistance information entry rendered by a rendering device of the worker.

At block S45, in response to a determination that an assistance information entry matching with the machine data and the task data is not found, the computing device establishes a connection with a remote expert, and provides visual assistance information from the remote expert to the worker.

At block S46, the computing device obtains operations of the worker on the machine.

At block S47, the computing device provides evaluation information. When the assistance information entry is found, the computing device may compare the information about the operations of the worker with information about operations in the an assistance information entry, and generate an evaluation result based on a comparison result. When the expert is connected, the computing device may carry out the remote inspection process of worker operations, e.g., the process as shown in FIG. 7.

At block S48, the computer device judges whether the worker operations are qualified; in response to a determination that the worker operations are not qualified, the procedure of block S45 may be performed to connect to an expert for further assistance; in response to a determination that the worker operations are qualified, the procedure of block S49 may be performed.

At block S49, the computing device provide the evaluation result to the worker, and may create and store an assistance information entry in response to a determination that the evaluation result is provided by a remote expert. It can be seen that, by storing information about the visual assistance information into a database and rendering the visual assistance information specified by the stored information at a working site of a second machine, the method can reuse the visual assistance information provided by a remote person, and making the assistance information available whenever and wherever needed.

The teachings of the present disclosure may be practiced in a non-transitory computer readable storage medium having stored therein one or more instructions, which, when executed by a computing device, cause the computing device to achieve at least some components of the above computing device. In particular, it may include a system or apparatus equipped with a storage medium on which software program codes for realizing the functions of any of the above-described embodiments are stored, and a computer (or a CPU or an MPU of the system or apparatus) reads out and executes the program code stored in the storage medium. In this case, the program code itself read from the storage medium can realize the function of any one of the above-described embodiments, and thus the program code and the storage medium storing the program code constitute a part of the present disclosure. The non-transitory computer readable storage medium includes a hard disk, a floppy disk, a magnetic disk, a compact disk (e.g., CD-ROM, CD-R, CD-RW, DVD-ROM, DVD-RAM, DVD-RW and DVD+RW), a tape, a Flash card, ROM, and so on. Optionally, it is possible to download the program codes from a server computer via a communication network.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for remote assistance, the method comprising:
   determining a state of a machine deployed at a working site;
   setting a digital twin of the machine to the determined state, the digital twin including a virtual model of the machine on a server at a remote site;
   rendering the digital twin at the remote site using a remote rendering device to enable a remote person at the remote site to perform an operation on the digital twin; and
   mapping an effect of the operation by rendering the effect on the digital twin into visual assistance information displayed onto the machine at the working site using a local rendering device deployed at the working site.

2. The method according to claim 1, wherein mapping an effect of the operation comprises:
   identifying a component of the machine corresponding to a component of the digital twin operated on by the remote person;
   generating visual content of the operation according to the effect caused by the operation on the digital twin; and
   using the local rendering device to render the visual content at a position of the component of the machine.

3. The method according to claim 2, wherein rendering the visual content at a position of the component of the machine comprises:
   obtaining a working site image which depicts the working site and includes the machine;
   generating an overlay image which includes the visual content at a position corresponding to the component in the working site image; and
   using the local rendering device to render the overlay image superimposed onto the working site image.

4. The method according to claim 2, wherein rendering the visual content at a position of the component of the machine comprises:
   obtaining a position and a size of the component of the machine;
   generating a projection image which includes the visual content with a position and a size corresponding to the position and the size of the component; and
   using the local rendering device to project the projection image onto the machine.

5. The method according to claim 1, further comprising rendering a second effect of a second operation on the machine at the remote site using a remote rendering device;
   wherein the second operation is performed on the machine by a local person at the working site.

6. The method according to claim 2, wherein the visual content comprises at least one of:
   a digital mark made on a component of the machine;
   moving pictures presenting a hand performing an operation; or
   visual content presenting a component in a different state after an operation.

7. The method according to claim 1, further comprising:
   translating the operation into a control command; and
   causing the machine to perform an action specified by the control command.

8. The method according to claim 1, further comprising:
making information of a workpiece produced by the machine presented by the remote rendering device for the remote person to provide feedback; and
making feedback information made on the workpiece by the remote person presented by the local rendering device.

9. The method according to claim 1, wherein setting the digital twin to the determined state comprises:
obtaining the information about the state of the machine from a device at the working site.

10. The method according to claim 9, wherein obtaining the information about the state of the machine comprises at least one of:
receiving parameters of the machine from a control apparatus of the machine as the information; and
receiving sensor data from at least one sensor coupled to the machine as the information.

11. The method according to claim 9, wherein setting the digital twin comprises modifying parameters of the digital twin until a simulated state of the digital twin is identical to the state specified by the information.

12. The method according to claim 1, wherein rendering the effect on the digital twin comprises:
providing an image of the digital twin to the remote rendering device;
identifying in the digital twin a component being operated on by the remote person using a remote device which captures a gesture of the remote person; and
changing a visual effect of the component in the image rendered by the remote rendering device.

13. The method according to claim 1, further comprising:
storing an assistance information entry into a database, the assistance information entry including at least one of: the operation performed by the remote person, data of the digital twin, the information about the state of the machine, information about a task of the machine obtained via a human-machine interface; information about a workpiece produced by the machine; and
in response to a request for assistance, rendering the visual assistance information specified in the assistance information entry onto a second machine using a second local rendering device deployed at a second working site of the second machine in response to a determination that the assistance information entry stored in the database matches with information in the request.

14. A computing device comprising:
a processor; and
a memory storing computer-readable instructions executable by the processor to:
determine a state of a machine deployed at a working site;
set a digital twin of the machine to the determined state, the digital twin including a virtual model of the machine on a server at a remote site;
render the digital twin at a remote site using a remote rendering device to enable a remote person at the remote site to perform an operation on the digital twin; and
render an effect of the operation as visual assistance information onto the machine at the working site using a local rendering device deployed at the working site.

15. A computer readable storage medium, storing computer-readable instructions executable by a processor to:
determine a state of a machine deployed at a working site;
set a digital twin of the machine to the determined state, the digital twin including a virtual model of the machine on a server at a remote site;
render the digital twin at a remote site using a remote rendering device to enable a remote person at the remote site to perform an operation on the digital twin; and
render an effect of the operation as visual assistance information onto the machine at the working site using a local rendering device deployed at the working site.

* * * * *